(12) United States Patent
Rowe et al.

(10) Patent No.: US 8,007,246 B2
(45) Date of Patent: Aug. 30, 2011

(54) METHODS AND APPARATUS FOR COATING GAS TURBINE ENGINES

(75) Inventors: Raymond Grant Rowe, Niskayuna, NY (US); Tara Easter McGovern, Simpsonville, SC (US); Jane Ann Murphy, Franklin, OH (US); Andrew Jay Skoog, West Chester, OH (US); William R. Stowell, Rising Sun, IN (US); Paul Thomas Marks, Simpsonville, SC (US); Lisa DeBellis, Simpsonville, SC (US); James H. Clare, Crosby, TX (US)

(73) Assignee: General Electric Company, Schenectady, NY (US)

( * ) Notice: Subject to any disclaimer, the term of this patent is extended or adjusted under 35 U.S.C. 154(b) by 1479 days.

(21) Appl. No.: 11/654,182

(22) Filed: Jan. 17, 2007

(65) Prior Publication Data

US 2011/0044821 A1 Feb. 24, 2011

(51) Int. Cl.
*F01D 5/18* (2006.01)
(52) U.S. Cl. .................. 416/241 R; 416/241 B
(58) Field of Classification Search .......... 416/241 R, 416/241 B; 428/469, 472
See application file for complete search history.

(56) References Cited

U.S. PATENT DOCUMENTS

| | | | |
|---|---|---|---|
| 5,780,162 A * | 7/1998 | Toyoda et al. | 428/428 |
| 5,830,586 A | 11/1998 | Gray et al. | |
| 6,007,919 A | 12/1999 | Skoog et al. | |
| 6,047,539 A | 4/2000 | Farmer | |
| 6,057,030 A * | 5/2000 | Mano | 428/307.7 |
| 6,165,600 A * | 12/2000 | Ivkovich et al. | 428/213 |
| 6,177,186 B1 | 1/2001 | Skoog et al. | |
| 6,180,184 B1 | 1/2001 | Gray et al. | |
| 6,210,791 B1 | 4/2001 | Skoog et al. | |
| 6,294,261 B1 | 9/2001 | Sangeeta et al. | |
| 6,306,517 B1 | 10/2001 | Gray et al. | |
| 6,432,487 B1 | 8/2002 | Graham et al. | |
| 6,465,090 B1 | 10/2002 | Stowell et al. | |
| 6,485,590 B1 | 11/2002 | Ivkovich, Jr. et al. | |
| 6,503,574 B1 | 1/2003 | Skelly et al. | |
| 2011/0038710 A1 | 2/2011 | Kemppainen et al. | |

* cited by examiner

*Primary Examiner* — Igor Kershteyn
(74) *Attorney, Agent, or Firm* — Armstrong Teasdale LLP

(57) ABSTRACT

A method of fabricating a component for a gas turbine engine is provided. The method includes applying a bond coat to at least a portion of the component, applying a dense vertically cracked (DVC) thermal barrier coating to at least a portion of the bond coat using a spray mechanism positioned a first distance from the component, and overlying at least a portion of the DVC thermal barrier coating with a soft coat thermal barrier coating using a spray mechanism that is positioned a second distance away from the component, wherein the second distance is greater than the first distance to facilitate adherence of the soft coating thermal barrier coating to the DVC thermal barrier coating.

17 Claims, 3 Drawing Sheets

METHODS AND APPARATUS FOR COATING GAS TURBINE ENGINES

BACKGROUND OF THE INVENTION

This invention relates generally to gas turbine engines, and more particularly to methods and apparatus for fabricating a coating for gas turbine engine blades.

At least some known gas turbine engines include one or more turbine rotors, which include a rotor disk and a plurality of circumferentially-spaced rotor blades, sometimes referred to as blades. Known blades typically include an airfoil, a platform, a shank, and a dovetail. Each dovetail is received within a slot or opening defined in the rotor disk to secure the blades to the rotor disk. The airfoils extend from the disk into the flow of combustion gases within the engine and convert kinetic energy of the gas flow into rotational mechanical energy.

Fouling and surface degradation generally occur when as the result of burning fuels containing alkali metals that combine with sulfur during the combustion process and deposit low melting salts on the surface of the parts. Additional contaminants may come from air ingested and/or water injected for $NO_x$ control or power augmentation.

To facilitate protecting the blades during engine operation, at least some known turbine engine blades include a thermal barrier coating (TBC). However, known thermal barrier coatings sometimes have a relatively rough outer surface, and as such, some thermal barrier coatings may be prone to erosion caused by, for example, the adherence of contaminants, such as low melting salts or other contaminants that may be generated during combustion. Erosion of the thermal barrier coating may reduce effectiveness of the thermal barrier coating and/or may exacerbate further erosion, which may lead to even further performance degradation.

To facilitate reducing the effects of the rough outer surface of the TBC, at least some thermal barrier coatings are hand-polished to reduce the surface roughness and increase the erosion resistance of the thermal barrier coating. Hand polishing may increase the time, and/or effort, involved in fabricating turbine blades, and/or may increase the likelihood of human error during fabrication of the turbine blades. As a result, an overall cost of fabricating gas turbine engines including hand-polished blades may be higher than costs associated with fabricating other blades that are not hand-polished.

BRIEF DESCRIPTION OF THE INVENTION

A method of fabricating a component for a gas turbine engine is provided. The method includes applying a bond coat to at least a portion of the component, applying a dense vertically cracked (DVC) thermal barrier coating to at least a portion of the bond coat using a spray mechanism positioned a first distance from the component, and overlying at least a portion of the DVC thermal barrier coating with a soft coat thermal barrier coating with the spray mechanism that is positioned a second distance away from the component such that the second distance is greater than the first distance.

A method of fabricating a blade for a gas turbine engine is provided. The method includes applying a bond coat to at least a portion of the blade, applying a dense vertically cracked (DVC) thermal barrier coating to at least a portion of the bond coat using a spray mechanism positioned a first distance from the blade, and overlying at least a portion of the DVC thermal barrier coating with a soft coat thermal barrier coating with the spray mechanism that is positioned a second distance away from the blade such that the second distance is greater than the first distance.

A blade for a gas turbine engine is provided. The blade includes a first coating is applied to a portion of the blade, a second coating is sprayed onto at least a portion of the first coating at a first distance defined between a spray mechanism and the blade, a third coating is sprayed onto at least a portion of the second coating at a second distance defined between a spray mechanism and the blade such that the second distance is greater than the first distance, spraying the third coating at the second distance facilitates fabricating the third coating with a rougher surface finish than that of the second coating; and a fourth coating is applied to at least a portion of the third coating to facilitate reducing the amount of hand polishing required for the blade.

DETAILED DESCRIPTION OF THE INVENTION

Figure 1:
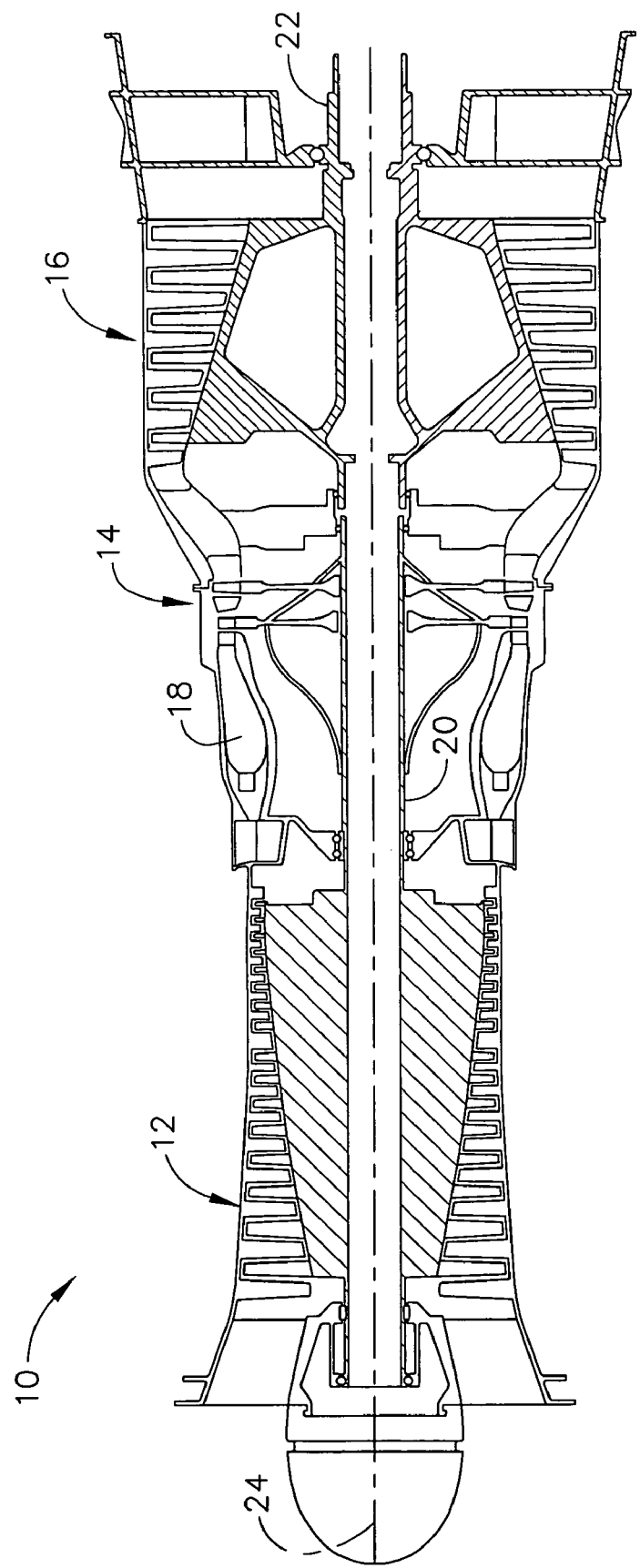
FIG. 1 is a cross-sectional schematic illustration of an exemplary gas turbine engine.

FIG. 1 is a schematic illustration of an exemplary gas turbine engine 10. In the exemplary embodiment, gas turbine engine 10 includes a compressor 12, a turbine 14, a turbine 16, and a combustor 18. Compressor 12 and turbine 14 are coupled together by a rotor shaft 20. In the exemplary embodiment, turbine 16 is coupled to an external load, such as, but not limited to, a generator (not shown) or a propeller (not shown) via a shaft 22. In some embodiments, engine 10 is a gas turbine engine commercially available from General Electric Company, Greenville, S.C. In operation, air flows through compressor 12 and compressed air is supplied to combustor 18, wherein the compressed air is mixed with a fuel and ignited to produce combustion gases. Combustion gases channeled from combustor 18 drive turbines 14 and 16, which drive rotation of respective shafts 20 and 22 about a longitudinal axis 24 for respectively powering compressor 12 and the external load.

Figure 2:
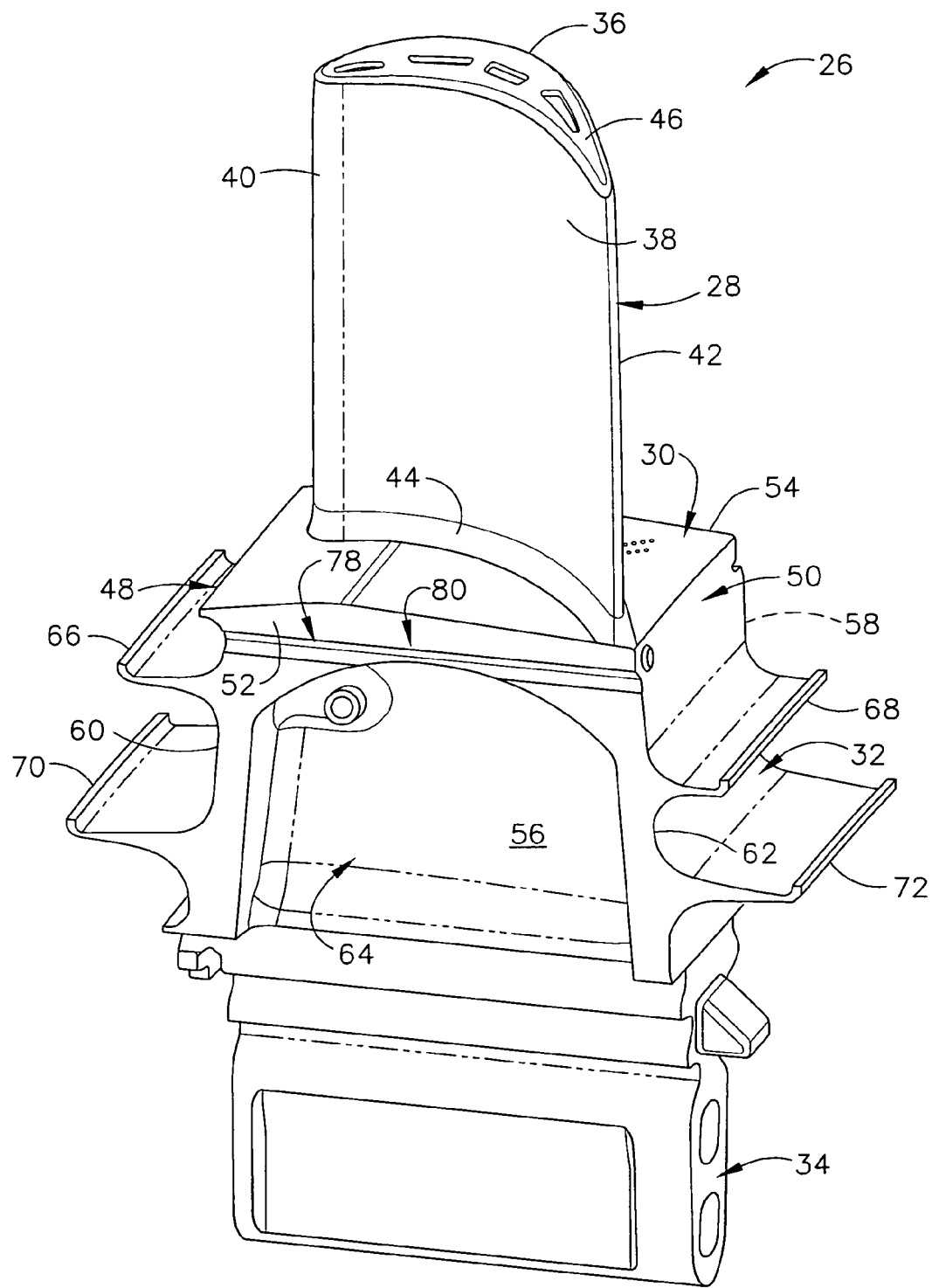
FIG. 2 is a perspective view of an exemplary rotor blade that may be used with a gas turbine engine, for example the gas turbine engine shown in FIG. 1.

FIG. 2 is a perspective view of an exemplary rotor blade 26 that may be used with a gas turbine engine, for example gas turbine engine 10 (shown in FIG. 1). A rotor assembly, for example turbine 14 (shown in FIG. 1), may include a plurality of rotor blades 26, oriented such that each rotor blade 26 is coupled to a rotor disk (not shown in FIG. 2) that is coupled to a rotor shaft, for example shaft 20 (shown in FIG. 1) and such that blades 26 are spaced about a circumference of the rotor disk. Each rotor blade 26 includes an airfoil 28, a platform 30, a shank 32, and a dovetail 34. Airfoil 28, platform 30, shank 32, and dovetail 34 are sometimes collectively referred to as a bucket. In an alternative embodiment, blade 26 includes a tip cap.

Each airfoil 28 includes opposite sidewalls 36 and 38. Sidewall 36 is convex and defines a suction side of airfoil 28, and sidewall 38 is concave and defines a pressure side of airfoil 28. Sidewalls 36 and 38 are joined together at a leading edge 40 and at an axially-spaced trailing edge 42 of airfoil 28. More specifically, airfoil trailing edge 42 is spaced chordwise and downstream from airfoil leading edge 40. Sidewalls 36 and 38 each extend longitudinally or radially outward in span from a blade root 44 positioned adjacent platform 30, to an airfoil tip 46.

Platform 30 extends between airfoil 28 and shank 32 such that airfoil 28 extends radially outward from platform 30. Shank 32 extends radially inwardly from platform 30 to dovetail 34, and dovetail 34 extends radially inwardly from shank 32 for coupling rotor blade 26 to the rotor disk. Platform 30 includes a leading edge side 48 and an opposite trailing edge side 50 that are connected together by a pair of opposing sidewalls 52 and 54, sometimes referred to as a pressure side and a suction side, respectively.

Shank 32 includes a substantially concave sidewall 56 and a substantially convex sidewall 58 connected together at an upstream sidewall 60 and a downstream sidewall 62 of shank 32. Accordingly, sidewall 56 is recessed with respect to upstream and downstream sidewalls 60 and 62, respectively, such that when blade 26 is coupled within the rotor assembly, a shank cavity 64 is defined between adjacent rotor blade shanks 32 for receiving cooling gas.

In the exemplary embodiment, a forward angel wing 66 and an aft angel wing 68 each extend outwardly from respective sidewalls 60 and 62 to facilitate sealing forward and aft angel wing buffer cavities (not shown) defined within the rotor assembly. In addition, forward and aft coverplates 70 and 72 also extend outwardly from respective sidewalls 60 and 62 to facilitate sealing between blade 26 and the rotor disk. More specifically, coverplates 70 and 72 each extend outwardly from shank 32 between dovetail 34 and respective angel wings 66 and 68.

Figure 3:
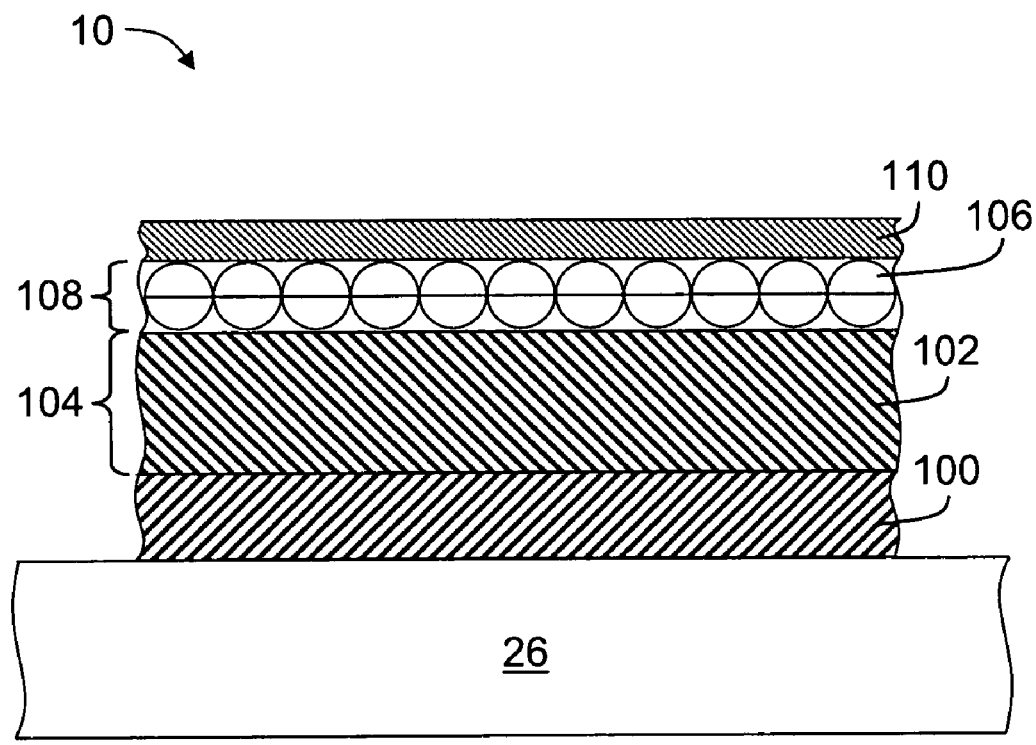
FIG. 3 is a side view of a portion of an exemplary rotor blade including a first coating, a second coating, a third coating, and a fourth coating that may be used with the gas turbine engine shown in FIG. 1.

FIG. 3 is a side view of a portion of an exemplary rotor blade including a first coating, a second coating, a third coating, and a fourth coating that may be used with the gas turbine engine shown in FIG. 1.

In the exemplary embodiment, a first coating 100, i.e. a bond coating, is applied to a substrate. In the exemplary embodiment, first coating 100 is applied to a portion of a substrate, specifically, a portion of blade 26. Moreover, in the exemplary embodiment, first coating 100 is applied to an E-class of blades 26. In an alternative embodiment, first coating 100 is applied to an F-class of blades 26. Alternatively, first coating 100 is applied to a portion of at least one of, but not limited to, airfoil 28 (shown in FIG. 2), shank 32 (shown in FIG. 2), and/or dovetail 34 (shown in FIG. 2) of rotor blade 26. In the exemplary embodiment, a thermal spray process is used to apply first coating 100 to a portion of blade 26.

First coating 100 is applied to the substrate to promote bonding a second coating 102 to the substrate. First coating 100 may include, for example, known plasma-spray coatings of metal alloys whose acronym, MCrAlY, designates the elements of comprising the alloy where M is Ni, Co, or combinations of Ni and Co.

In the exemplary embodiment, second coating 102 is applied to at least a portion of first coating 100. In the exemplary embodiment, second coating 102 is a dense vertically cracked (DVC) thermal barrier coating that facilitates thermally protecting blade 26. Second coating 102 is formed from, but not limited to, plasma-sprayed ceramic materials. In the exemplary embodiment, the ceramic material is a metal oxide, such as yttria stabilized zirconia having a composition of 6-8 weight percent yttria with a balance of zirconia. The zirconia may be stabilized with at least one of, but not limited to, calcium, ceria, magnesia, or other oxides. In the exemplary embodiment, second coating 102 is sprayed onto the substrate and/or first coating 100 using a spray gun forming a layer 104. In the exemplary embodiment, the spray gun used in a 7MB gun that is commercially available from Sultzer Metco. In an alternative embodiment, second coating 102 is sprayed onto a portion of first coating 100 and/or the substrate with any other suitable spray mechanism.

Specifically, second coating 102 is sprayed onto the substrate and/or first coating 100 using an air plasma spray (APS) process. Air plasma spray processes are used primarily for coating metals with oxides. Layer 104 may also be termed as an "individual layer" or "ceramic layer". In the exemplary embodiment, layer 104 has a thickness that is defined by primary layers and sub-layers. Specifically, in order to cover the entire surface of a substrate and/or first coating 100 and obtain the necessary thickness of second coating 102, it is generally desirable that the spray gun and the substrate be moved in relation to one another when depositing second coating 102. This can take the form of moving the gun, substrate, or both, and is analogous to processes used for spray painting. This motion, combined with the fact that a given spray gun sprays a pattern results in second coating 102 being deposited in primary layers and sub-layers to form layer 104. In the exemplary embodiment, second coating 102 is a dense low porosity surface that limits adherence of coatings to second coating 102.

In an alternative embodiment, well known methods and apparatuses are used to apply second coating 102 of the present invention to at least a portion of first coating 100 and/or the substrate. Specifically, in the alternative embodiment, second coating 102 may be sprayed onto first coating 100 and/or the substrate using, at least one of, but not limited to, a high velocity oxy-fuel (HVOF) process, a high velocity air-fuel (HVAF) process, gravity assisted shot peening (GASP), a vacuum pressure plasma spray process, a low pressure plasma spray process, an air plasma spray process, a wire arc process, and a flame spray process. In a further alternative embodiment, second coating 102 is applied to a portion of the bond coat and/or blade 26 using, but not limited to, a diffusion process, a cladding process, and a pre-sintered braze preform process. In a further alternative embodiment, second coating 102 may be applied to a portion of first coating 100 and/or the substrate with any other suitable process.

In the exemplary embodiment, a third coating 106 is applied to at least a portion of second coating 102. In the exemplary embodiment, third coating 106 is fabricated of substantially the same composition as second coating 102. In the exemplary embodiment, third coating 106 is sprayed to at least a portion of second coating 102 using a spray gun and forms a layer 108. In the exemplary embodiment, the spray gun used to apply third coating 106 to second coating 102 is the same spray gun used to apply second coating 102 to at least a portion of first coating 100. Specifically, third coating 106 is sprayed onto at least a portion of second coating 102 using the air plasma spray (APS) process.

In an alternative embodiment, well known methods and apparatuses are used to apply third coating 106 of the present invention to at least a portion of second coating 102. Specifically, in the alternative embodiment, third coating 106 may be sprayed onto second coating 102 using, at least one of, but not limited to, a high velocity oxy-fuel (HVOF) process, a high velocity air-fuel (HVAF) process, gravity assisted shot peening (GASP), a vacuum pressure plasma spray process, a low pressure plasma spray process, a wire arc process, and a flame spray process. In an alternative embodiment, third coating 106 is applied to second coating 102 using, but not limited to, a diffusion process, a cladding process, and a pre-sintered braze preform process. In a further alternative embodiment, third coating 106 may be applied to a portion of second coating 102 with any other suitable process.

Generally, in the exemplary embodiment, third coating 106 has a rougher surface finish than second coating 102 and facilitates enhancing erosion resistance. Third coating 106, i.e. a soft coating, is a porous coating. The properties and porosity of third coating 106 facilitate adhesion of third coating 106 to second coating 102. Specifically, third coating 106 adheres to fillets and narrow areas of second coating 102. In an alternative embodiment, third coating 106 has any surface finish that facilitates decreasing the degradation of the substrate and/or that facilitates reducing the susceptibility of surface fouling.

In the exemplary embodiment, a fourth coating 110 is applied to at least a portion of third coating 106. In an alternative embodiment, fourth coating 110 is not applied to third coating 106. In the exemplary embodiment, fourth coating 110 is an ETBC® coating (i.e. a smooth coating). ETBC® is a registered trademark of General Electric Company, located in Schenectady, N.Y. In the exemplary embodiment, fourth coating 110 is a composition of alumina suspended in an alcohol slurry, and is generally an alumina-base silica-bound ceramic material. More particularly, fourth coating 110 contains particles of alumina ($Al_2O_3$) that are dispersed within a binder matrix composed of silica ($SiO_2$), silicates and/or mullite ($3Al_2O_3 2SiO_2$), the relative amounts of which will vary depending on the temperature and subsequent service temperatures seen by fourth coating 110, with greater amounts of mullite forming at higher temperatures. The alumina particles constitute at least 5 up to about 85 weight percent of fourth coating 110. The relative amounts of alumina and silica-based matrix material in fourth coating 110 can be tailored depending on the properties desired for fourth coating 110.

In the exemplary embodiment, fourth coating 110 is applied to third coating 106 using a tape cast method. Fourth coating 110 adheres to third coating 106 and facilitates reducing surface roughness. The smoothness of fourth coating 110 substantially eliminates the need for hand polishing of blade 26. Moreover, fourth coating 110 reduces the amount of corrosive build up on blade 26. Specifically, fourth coating 110 increases erosion resistance by three times over other known blades in which fourth coating 110 is not applied. Moreover, known hand polishing processes require approximately one hour to completely hand polish blade 26. In the exemplary embodiment, when fourth coating 110 is applied, the time to completely hand polish blade 26 is reduced by 50%, i.e. hand polishing requires approximately 30 minutes. Furthermore, fourth coating 110 is not transparent in an IR heat range such that fourth coating 100 facilitates cooling of first, second, and third coatings 100, 102, and 106, and blade 26.

During assembly, first coating 100 is applied to a portion of a substrate including at least one of, but not limited to, platform 30, airfoil 28, shank 32, and/or dovetail 34 of rotor blade 26 to thermally protect blade 26. Alternatively, the first coating 100 may be applied to any suitable portion of engine 10. In a further alternative embodiment, rotor blade 26 may be provided with the first coating 100. Once first coating 100 is applied to the substrate, second coating 102 is applied to at least a portion of first coating 100. In an alternative embodiment, second coating 102 is applied directly to the substrate.

Second coating 102 may be applied to a portion of the bond coat and/or blade 26 by spraying second coating 102 onto a portion of first coating 100. Specifically, second coating 102 is sprayed onto a portion of the bond coat and/or the substrate with a mechanism (not shown) positioned at a first distance away from the substrate using the air plasma spray (APS) process. In the exemplary embodiment, the spray gun sprays second coating 102 in a first powder flow onto a portion of the bond coat and/or the substrate wherein the spray gun is heated to a first temperature. Second coating 102 is sprayed onto the bond coat and/or the substrate at a first velocity. Moreover, the gun is positioned at a first distance from the substrate at a first gun-to-work distance. The first gun-to-work distance is measured between the head (i.e. the tip) of the spray gun the substrate. Specifically, in the exemplary embodiment, the spray gun is heated to a first temperature between the range of approximately 750 to 1000 degrees Fahrenheit, the first gun velocity for spraying second coating 102 onto first coating 100 and/or the substrate is a range of approximately 590 mm/sec to 610 mm/sec, and the first gun-to-work distance is a range of approximately 0-3 inches. Moreover, when spraying second coating 102 onto a portion of the bond coat and/or the substrate, second coating 102 is applied such that layer 104 has a thickness of approximately 18 mils. In an alternative embodiment, second coating 102 may be applied to have any suitable thickness.

In the exemplary embodiment, after second coating 102 is applied to a portion of blade 26, third coating 106 is overlaid onto second coating 102 by applying third coating 106 to at least a portion of the surface area wherein second coating 102 is applied. In the exemplary embodiment, third coating 106 is sprayed onto second coating 102 with a mechanism (not shown) positioned at a second distance away from the substrate using the air plasma spray (APS) process. Specifically, in the exemplary embodiment, third coating 106 is sprayed onto a portion of second coating 102 using the same spray gun and substantially the same technique as is used to apply second coating 102 to the bond coat and/or the substrate, described above. In an alternative embodiment, a different spray mechanism is used to apply third coating 106 to second coating 102. In the exemplary embodiment, the spray gun sprays third coating 106 in a second powder flow onto a portion of second coating 102 wherein the spray gun is heated to a second temperature. The second powder flow is greater than the first powder flow. Third coating 106 is sprayed onto second coating 102 at a second velocity. Moreover, the gun is positioned at a second distance from the substrate and/or second coating 102 at a second gun-to-work distance. In the exemplary embodiment, the second gun-to-work distance is greater than the first gun-to-work distance used to spray second coating 102 onto first coating 100 which causes third coating 106 to be more porous than second coating 102. Specifically, in the exemplary embodiment, the spray gun is heated to a second temperature of approximately 850 degrees Fahrenheit, the second gun velocity for spraying third coating 106 onto second coating 102 is a range of approximately 300 mm/sec to 500 mm/sec, and the second gun-to-work distance is a range of approximately 3-7 inches. Moreover, when spraying third coating 106 onto a portion of the second coating 102, third coating 106 is applied with a thickness of approximately 2 mils. In an alternative embodiment, third coating 106 may be applied to have any suitable thickness.

By increasing the gun-to-work distance, third coating 106 is more porous (i.e. a soft coat) than second coating 102. Being that third coating 106 is more porous than second coating 102, third coating 106 has increased adhesive properties facilitating third coating 106 to adhere to second coating 102. Third coating 106 adheres to narrow areas and fillets of second coating 102.

Third coating 106 facilitates reducing manufacturing costs, both in terms of shortening fabrication times and reducing scrap rates, because third coating 106 has less fallout than second coating 102. Specifically, the surface finish of the coatings may be more closely controlled by reducing the amount of hand polishing needed to reduce the surface roughness, because a hand polisher may deplete the thickness to a point that the blade needs to be recoated. Moreover, controlling the thickness of the coatings prevents abrading third coating 106.

Once third coating 106 has been applied to at least a portion of second coating 102, fourth coating 110 is applied to at least a portion of third coating 106 to facilitate reducing heat transfer. In the exemplary embodiment, fourth coating 110 is applied to a portion of third coating 106 having a thickness of approximately 0.5-4 mils. With reduced heat transfer, the durability of blade 26 is facilitated to increase and blade 26 will be less susceptible to surface fouling. In addition, the overall aerodynamic performance of the blade 26 is increased. Moreover, coatings 100, 102, 106, and 110 are of nominal weight such that coatings 100, 102, 106, and 110 do not negatively impact engine efficiency.

Exemplary embodiments of methods and coatings are described and/or illustrated herein in detail. The methods and coatings are not limited to the specific embodiments described herein, but rather, steps of each method and components of each coating may be utilized independently and separately from other steps and/or components described herein. Each method step and component can also be used in combination with other method steps and/or components.

When introducing elements/components/steps/etc. of the methods and damper pins described and/or illustrated herein, the articles "a", "an", "the", "said", and "at least one" are intended to mean that there are one or more of the element(s)/component(s)/step(s)/etc. The terms "comprising", "including" and "having" are intended to be inclusive and mean that there may be additional element(s)/component(s)/step(s)/etc. other than the listed element(s)/component(s)/step(s)etc.

While the invention has been described in terms of various specific embodiments, those skilled in the art will recognize that the invention can be practiced with modification within the spirit and scope of the claims.

What is claimed is:

1. A method of fabricating a component for a gas turbine engine, said method comprising:
   applying a bond coat to at least a portion of the component;
   applying a dense vertically cracked (DVC) thermal barrier coating to at least a portion of the bond coat using a spray mechanism positioned a first distance from the component; and
   overlying at least a portion of the DVC thermal barrier coating with a soft coat thermal barrier coating using a spray mechanism that is positioned a second distance away from the component, wherein the second distance is greater than the first distance to facilitate adherence of the soft coating thermal barrier coating to the DVC thermal barrier coating.

2. A method in accordance with claim 1 wherein applying a DVC thermal barrier coating to at least a portion of the bond coat further comprises positioning the spray mechanism approximately 2 inches away from the component.

3. A method in accordance with claim 1 wherein applying the soft coat thermal barrier coating to at least a portion of the DVC thermal barrier coating further comprises positioning the spray mechanism approximately 6 inches away from the component.

4. A method in accordance with claim 1 wherein overlying at least a portion of the DVC thermal barrier coating with the soft coat thermal barrier coating comprises overlying at least a portion of the DVC thermal barrier coating with a composition including a porous layer that is approximately 1-4 mils thick.

5. A method in accordance with claim 1 wherein overlying at least a portion of the DVC thermal barrier coating with a soft coat thermal barrier coating comprises spraying the soft coat thermal barrier coating onto the DVC thermal barrier coating.

6. A method in accordance with claim 5 wherein spraying the soft coat thermal barrier coating onto the DVC thermal barrier coating comprises spraying the DVC thermal barrier coating using at least one of a high velocity oxy-fuel (HVOF) process, a high velocity air-fuel (HVAF) process, an air plasma spray (APS) process, a vacuum pressure plasma spray process, a low pressure plasma spray process, a wire arc process, and a flame spray process.

7. A method in accordance with claim 1 wherein overlying at least a portion of the DVC thermal barrier coating with a soft coat thermal barrier coating comprises forming a surface that is rougher than the surface of the DVC thermal barrier coating.

8. A method of fabricating a blade for use in a gas turbine engine, said method comprising:
   applying a bond coat to at least a portion of the blade;
   applying a dense vertically cracked (DVC) thermal barrier coating to at least a portion of the bond coat using a spray mechanism positioned a first distance from the blade; and
   overlying at least a portion of the DVC thermal barrier coating with a soft coat thermal barrier coating using a spray mechanism that is positioned a second distance away from the blade, wherein the second distance is greater than the first distance.

9. A blade for a gas turbine engine, said blade comprising:
   a first coating applied to a portion of said blade;
   a second coating sprayed over at least a portion of said first coating, said second coating being sprayed from a sprayer that is a first distance from said blade, wherein said second coating comprises a plurality of fillets and narrow areas;
   a third coating sprayed over at least a portion of said second coating, said third coating being sprayed from a sprayer that is a second distance from said blade, said second distance is longer than said first distance, said third coating having a rougher outer surface finish than an outer surface finish of said second coating, wherein said third coating comprises porous properties that facilitate said third coating adhering to said plurality of fillets and said narrow areas; and
   a fourth coating applied over at least a portion of said third coating to facilitate reducing an amount of hand polishing of said blade.

10. A blade in accordance with claim 9 wherein said first distance is approximately 2 inches and said second distance is approximately 6 inches.

11. A blade in accordance with claim 9 wherein said second coating has a thickness of approximately 18 mils.

12. A blade in accordance with claim 9 wherein said third coating has a thickness of approximately 2 mils.

13. A blade in accordance with claim 9 wherein said first coating is a bond coating.

14. A blade in accordance with claim 9 wherein said second coating comprises a metal oxide comprising a composition between 6-8 percent by weight of yttria with a balance of zirconia.

15. A blade in accordance with claim 9 wherein said third coating comprises the substantially same composition as said second coating.

16. A blade in accordance with claim 9 wherein said fourth coating comprises a composition of alumina (Al2O3) dispersed within a binder matrix composed of at least one of silica (SiO2), silicate, and mullite (3Al2O32SiO2).

17. A blade in accordance with claim 16 wherein said fourth coating is applied to said third coating using at least one of a spray method and a tape cast method.

* * * * *